US012522496B1

(12) United States Patent

Andersen

(10) Patent No.: US 12,522,496 B1
(45) Date of Patent: Jan. 13, 2026

(54) MONITORING SYSTEM FOR BULK CHEMICAL DELIVERY

(71) Applicant: Cairn 5, LLC, Fayetteville, AR (US)

(72) Inventor: Trent Andersen, Fayetteville, AR (US)

(73) Assignee: Cairn 5, LLC, Fayetteville, AR (US)

( * ) Notice: Subject to any disclaimer, the term of this patent is extended or adjusted under 35 U.S.C. 154(b) by 23 days.

(21) Appl. No.: 18/757,115

(22) Filed: Jun. 27, 2024

Related U.S. Application Data

(60) Provisional application No. 63/524,244, filed on Jun. 30, 2023.

(51) Int. Cl.
*B67D 7/34* (2010.01)
*B67D 7/02* (2010.01)

(52) U.S. Cl.
CPC ........... *B67D 7/0288* (2013.01); *B67D 7/346* (2013.01); *B67D 2210/00062* (2013.01)

(58) Field of Classification Search
CPC ........... B67D 7/34; B67D 7/344; B67D 7/346
See application file for complete search history.

(56) References Cited

U.S. PATENT DOCUMENTS

| | | | | |
|---|---|---|---|---|
| 9,546,087 B1 * | 1/2017 | Tucker | B67D 7/3209 | |
| 2003/0085796 A1 * | 5/2003 | Smith | G07F 9/10 | 340/5.4 |
| 2010/0078184 A1 * | 4/2010 | Pellittiere, II | A62C 31/12 | 169/51 |
| 2011/0168724 A1 * | 7/2011 | Bruinius | B65D 90/22 | 70/174 |
| 2014/0129038 A1 * | 5/2014 | Finnell | B67D 7/32 | 700/282 |
| 2015/0186837 A1 * | 7/2015 | Bianco | B60P 3/2245 | 235/381 |

* cited by examiner

*Primary Examiner* — Timothy P. Kelly
(74) *Attorney, Agent, or Firm* — Polsinelli PC

(57) ABSTRACT

A monitoring system for bulk chemical delivery is described. Upon arrival at the system, a delivery truck driver inputs delivery information into a controller of the system, and the controller unlocks a locker holding a hose connection such that the delivery driver can connect the hose connection onto their delivery hose and complete the bulk delivery of the chemical.

19 Claims, 12 Drawing Sheets

FIG. 17
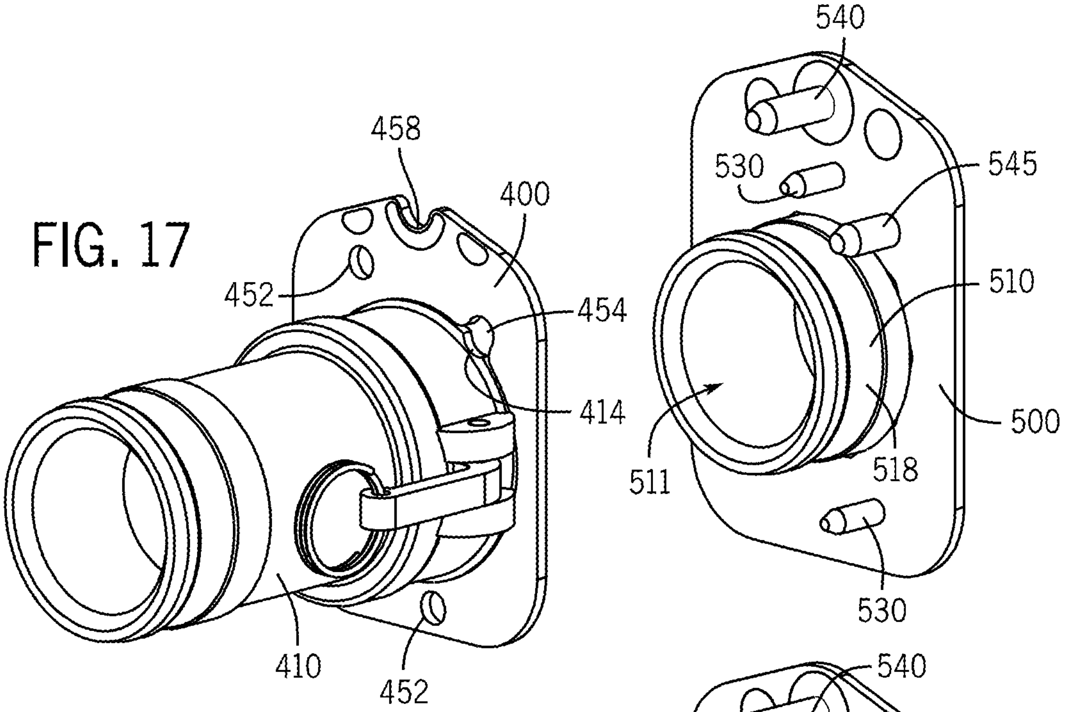
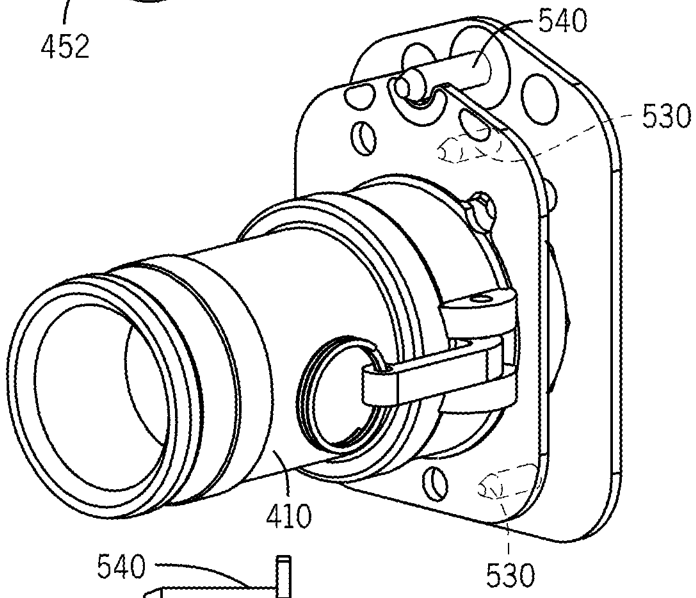
FIG. 18
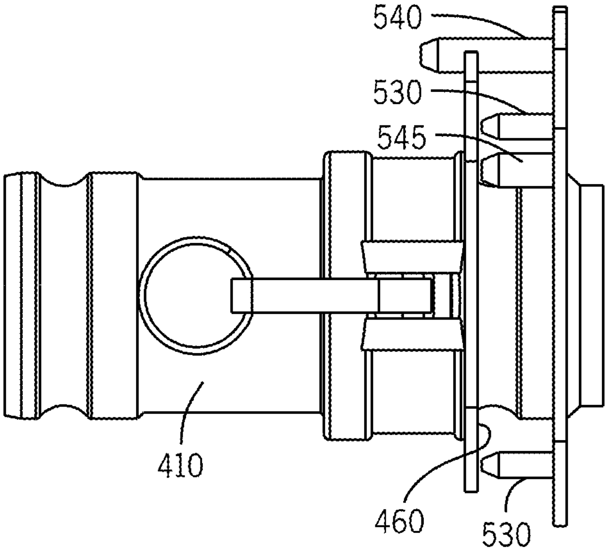
FIG. 19

MONITORING SYSTEM FOR BULK CHEMICAL DELIVERY

The present application claims priority to U.S. Provisional Patent Application No. 63/524,244 filed Jun. 30, 2023, which is hereby incorporated by reference in its entirety.

FIELD OF INVENTION

The present invention relates to a monitoring system for bulk chemical delivery.

BACKGROUND OF INVENTION

Many industrial facilities receive bulk delivery of chemicals to their industrial facility. A truck may drive to the industrial facility and transfer a bulk chemical directly to a bulk tank at the industrial facility. A single industrial facility may include many different bulk tanks each holding different chemicals. If the wrong chemical is delivered to the wrong tank, then the bulk tank may require emptying and the mixture of the wrong chemicals may require disposal. Further, a dangerous chemical reaction may occur from filling the bulk tank with the wrong chemical.

SUMMARY OF INVENTION

A monitoring system for bulk chemical delivery to a bulk tank is described. The monitoring system may improve safety and reduce accidental chemical contamination. Fittings for bulk chemical delivery are also described. The fittings may provide a keyed combination such that only fittings for a particular chemical may operate together.

In another aspect, a monitoring system for bulk chemical delivery to a bulk tank is described. Upon arrival at the system, a delivery truck driver inputs or shares delivery information with a controller of the system, and the controller unlocks a locker holding a hose connection that the delivery driver connects to their delivery hose such that the delivery driver can connect to a tank connection on the bulk tank and complete the bulk delivery of the chemical.

In certain aspects, each bulk tank will include a specific hose fitting or connection and specific tank fitting or connection that is configured to only operate with each other. This reduces the likelihood of accidentally delivering the wrong chemical to the bulk tank.

In another aspect, a monitoring system for bulk chemical delivery is described. The system includes a controller. The system includes a tank connection. The tank connection is configured to fluidically connect with a bulk chemical tank. The system includes a hose connection. The hose connection is configured to fluidically connect with a delivery hose and the tank connection. The system includes a locker. The locker is configured to hold or contain the hose connection in a locked configuration or an unlocked configuration. The controller directs the locker to switch between the locked configuration and the unlocked configuration.

In another aspect, a method of monitoring bulk chemical delivery is described. The method includes providing a monitoring system comprising a controller and a tank connection. The tank connection is configured to fluidically connect with a bulk chemical tank. The system includes a hose connection, which is configured to fluidically connect with a delivery hose and the tank connection. The system includes a locker configured to hold or contain the hose connection in a locked configuration or in an unlocked configuration. The controller directs the locker to switch between the locked configuration and the unlocked configuration. The method includes reading a bar code or other code on a bill of lading or other delivery document. The method includes directing the locker to switch or change from the locked configuration to the unlocked configuration. The method includes detecting a return of the hose connection to the locker. The method includes directing the locker to switch from the unlocked configuration to the locked configuration.

In another aspect, a keyed fitting for a bulk chemical delivery hose and a keyed fitting for a bulk chemical tank are described. The keyed fittings improve safety and provide chemical identification confirmation. The keyed fittings are specific to a particular chemical. A particular keyed fitting for the bulk chemical delivery hose will only operate with a particular keyed fitting of the bulk chemical tank. The keyed fittings reduce the likelihood of improperly filling a bulk chemical tank with the wrong chemical, which reduces accidental chemical contamination. Further, the keyed fittings help to ensure that a correct chemical has been delivered to a proper bulk tank for that chemical.

In another aspect, a connection system for a bulk chemical delivery is described. The connection system includes a tank connection. The tank connection is configured to fluidically connect with a bulk chemical tank. The connection system includes a hose connection. The hose connection is configured to fluidically connect with a hose and the tank connection. The tank connection includes a male cam lock. The male cam lock extends from a front surface of a male key plate. Two or more combination pins extend from the front surface of the male key plate. The hose connection includes a female cam lock. The female cam lock extends from a front surface of a female key plate. Two or more through-holes are formed in the female key plate. The female cam lock fits over the male cam lock and the two or more through-holes receive the two or more combination pins.

BRIEF DESCRIPTION OF DRAWINGS

FIG. 17 is a view of incompatible hose and tank connections.

FIG. 18 is a view of incompatible hose and tank connections.

FIG. 19 is a view of incompatible hose and tank connections.

DETAILED DESCRIPTION OF INVENTION

Figure 1:
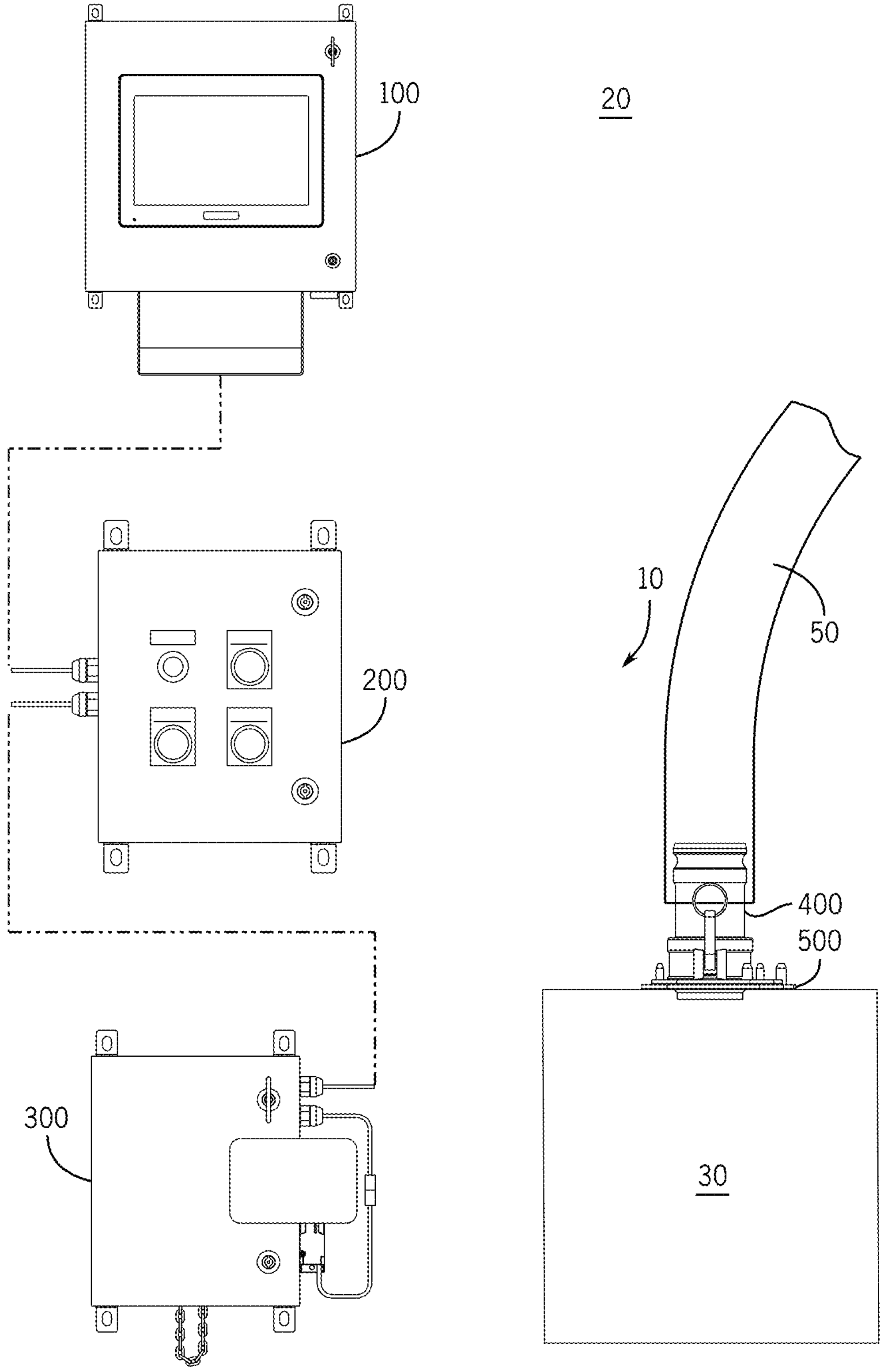
FIG. 1 is a schematic view of the monitoring system for bulk chemical delivery.

For purposes of this application, any terms that describe relative position (e.g., "upper", "middle" "lower", "outer", "inner", "above", "below", "bottom", "top", etc.) refer to an aspect of the invention as illustrated, but those terms do not limit the orientation in which the embodiments can be used.

A monitoring system 10 for bulk chemical delivery will now be described with reference to FIGS. 1-19. The system 10 may be used in any of a variety of industrial facilities 20 to monitor the delivery of liquid chemicals to bulk storage tanks 30 at the respective facilities 20. The industrial facilities 20 may include food manufacturing facilities or other facilities which utilize bulk chemical delivery or storage. The industrial facilities 20 generally include many different bulk storage tanks 30 which are intended to hold different chemicals.

The system 10 includes a main controller 100 that may be positioned at a guard shack, headquarters, main gate, administrative office, or other location of the industrial facility 20. The main controller 100 may include controls, a computing device, memory, and input devices to operate and control the system 10. The system 10 includes one or more subcontrollers 200 that may be positioned about the industrial facility 20. The main controller 100 is in electrical communication with the one or more subcontrollers 200. The subcontrollers 200 may also include a computing device with a memory.

The system 10 includes one or more lockers 300. The lockers 300 generally include a secure structure that holds or contains the hose connection 400 until time for use. The locker 300 may include, for example, a box-like or cage-like structure. The locker 300 may include other structures that restrict use of the hose connection 400. The hose connection 400 is generally not removable from the locker 300 until the main controller 100 and/or the subcontroller 200 allows or permits such removal.

The one or more subcontrollers 200 are in electrical communication with the one or more lockers 300. The subcontrollers 200 electrically signal the lockers 300 to unlock and/or lock their respective doors 310. The main controller 100 and the one or more subcontrollers 200 are in electrical communication with the one or more lockers 300. These components may electrically communicate via wired and wireless connectivity. These components may be electrically connected via ethernet, Bluetooth, WIFI, etc. or through other wired and wireless electrical communication systems and protocols.

In this aspect, the one or more lockers 300 generally include an interior 305 configured to securely hold a hose connection 400. Each locker 300 is intended to hold a single hose connection 400. In the aspect of FIGS. 1-19, the locker 300 includes the door 310 hingedly engaged to the locker 300 that covers the interior 305.

A lockbolt 315 and a locking mechanism 316 lock and unlock the door 310. In this aspect, the subcontroller 200 directs the locking and unlocking of the door 310. In this aspect, the lockbolt 315 is part of or integrated with the door 310. The subcontroller 200 is in electrical communication with the locking mechanism 316, which is part of or integrated with the locker 300. In certain aspects, at the direction of the main controller 100, the subcontroller 200 electrically signals the locking mechanism 316 to lock and unlock the door 310 via the lockbolt 315. In other aspects, the main controller 100 electrically signals the locking mechanism 316 to lock and unlock the door 310 via the lockbolt 315.

The locker 300 may include a detector 320, such as a laser or camera, which detects when the hose connection 400 has been removed and/or returned to the interior 305 of the locker 300. The locker 300 may further include a scale that detects when the weight of the hose connection 400 has been returned to the interior 305. The detector 320 and/or the scale may be in electrical communication with the main controller 100 and/or the subcontroller 200.

The hose connection 400 is configured to operate with a tank connection 500. Each hose connection 400 is generally designed to only operate with a specific tank connection 500. In the system 10, each specific chemical uses a specific hose connection 400 in order to mate or join with the corresponding tank connection 500. For example, the hose connection 400 for Chemical A will not work with the tank connection 500 for Chemical B. This helps to prevent the user from accidently filling the bulk storage tank 30 with the wrong chemical.

When the user arrives at the industrial facility 20, the system 10 reviews or scans the user's bill of lading 40 or other delivery information for a code (other indicia) indicating which chemical is being delivered. The system 10 opens the specific locker 300 for the chemical specified in the bill of lading 40 or other delivery information such that the specific hose connection 400 may be used by the user. The bill of lading 40 may include a printed delivery ticket, invoice, an email, text, other electronic notification, etc. with the code indicating the specific chemical to be delivered. The bill of lading 40 may include other delivery information including, for example, the identification of the facility 20, the date and/or time for delivery, an amount of the chemical to be delivered, etc.

As described below, the specific hose connection 400 is configured to only operate with the specific tank connection 500. The user attaches the specific hose connection 400 to the bulk delivery hose 50 from their vehicle. The hose connection 400 may attach to most delivery hoses 50. The user then connects the hose connection 400 to the specific tank connection 500 on the bulk storage tank 30. Next, the user delivers the chemical through the bulk delivery hose 50, through the hose connection 400, through the specific tank connection 500, and into the bulk storage tank 30. Upon completion of delivery of the chemical, the user removes the hose connection 400 form their bulk delivery hose 50 and returns the hose connection 400 to the locker 300.

The main controller 100 includes a human machine interface (HMI) 110 for the user to communicate with and/or control the system 10. The HMI 110 may include a touch screen, a display screen, input devices, keyboards, etc. The HMI 110 may include indicators to indicate various statuses, warnings, and/or notifications regarding the system 10 and its components. For example, the HMI 110 may indicate that one of the doors 310 is open, that one of the doors 310 is closed, that the hose connection 400 is in the interior 305 of the locker 300, that the hose connection 400 is not in the interior 305 of the locker 300, that an alarm condition has been sounded, etc. The HMI 110 may display various icons of different flashing, colors, and color sequences to indicate a current status of the various lockers In the aspect of FIG. 3, the HMI 110 of the main controller 100 shows the status of three different lockers 300. For example, the status for the locker 300 for the chemical BasicpHresh is "door open fitting removed." The status for the locker 300 for the OxypHresh 22 and C2H5OH is "locked". The HMI 110 may include menus to control and operate different features of the system 10.

Figure 4:
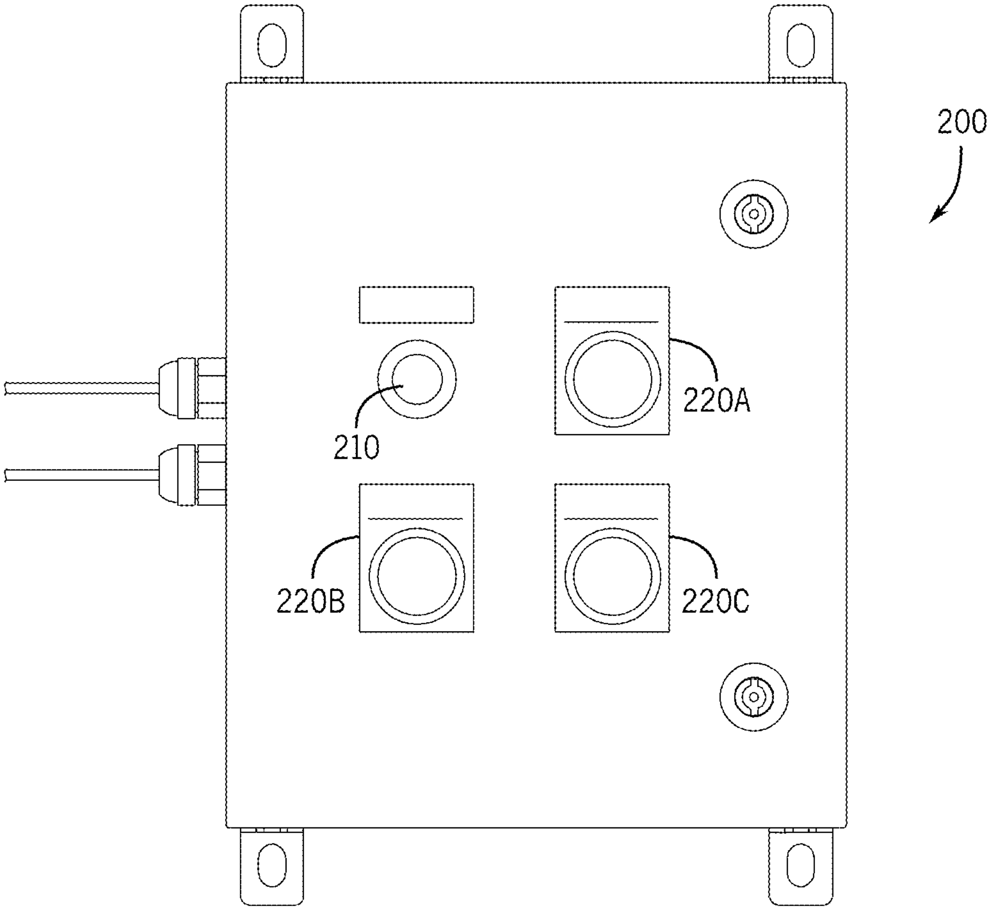
FIG. 4 is view of the subcontroller.
Figure 5A:
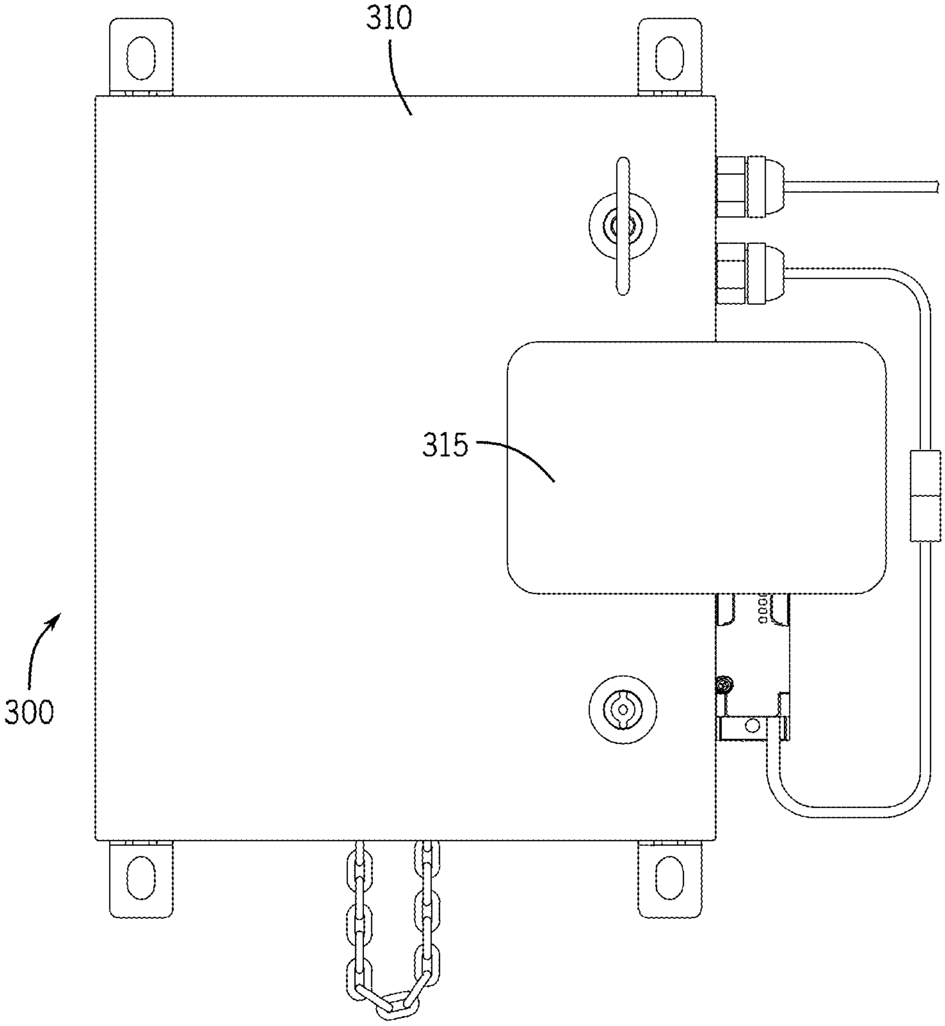
FIG. 5A is a view of the locker with the door closed.
Figure 5B:
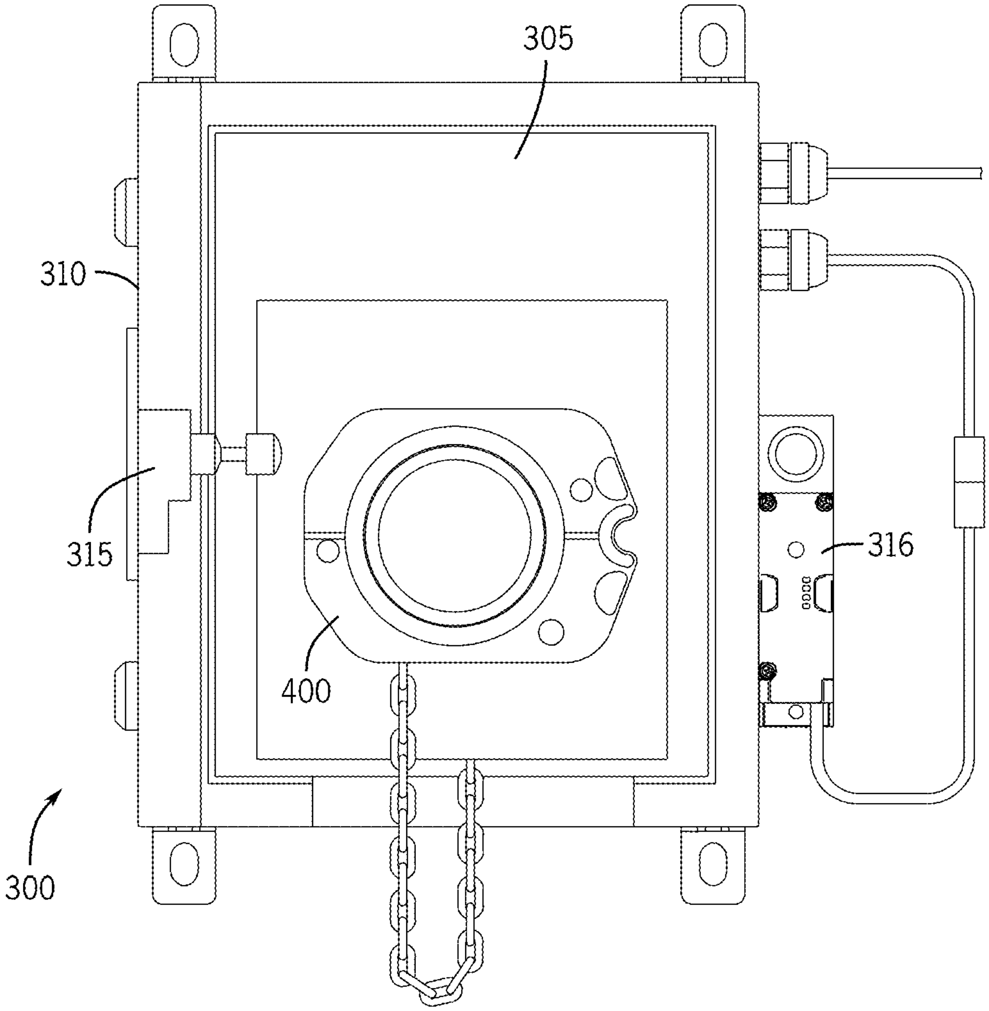
FIG. 5B is a view of the locker with the door open and the hose connection inside of the locker.
Figure 5C:
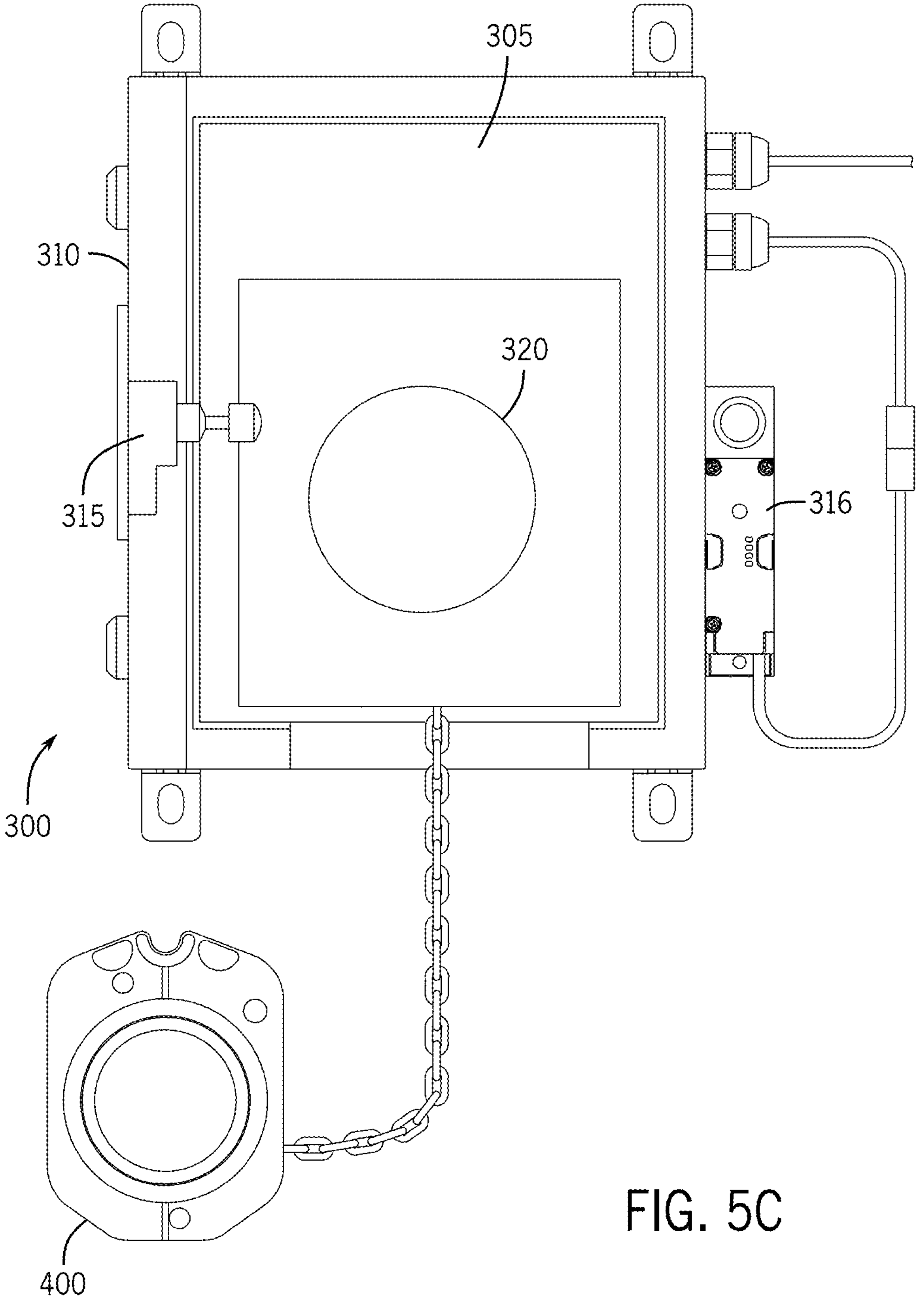
FIG. 5C is a view of the locker with the door open and the hose connection removed from the locker.
Figure 6:
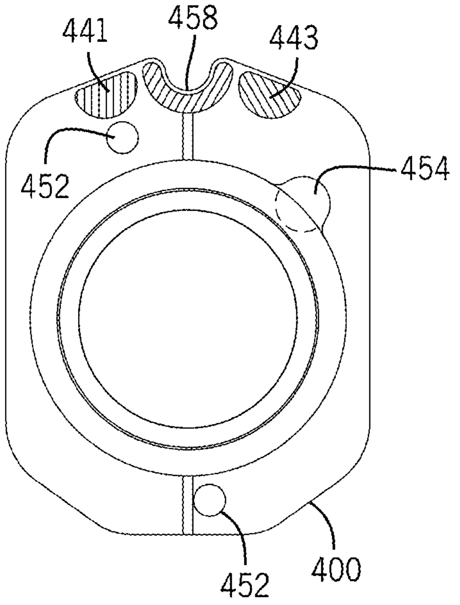
FIG. 6 is a front view of the hose connection.
Figure 7:
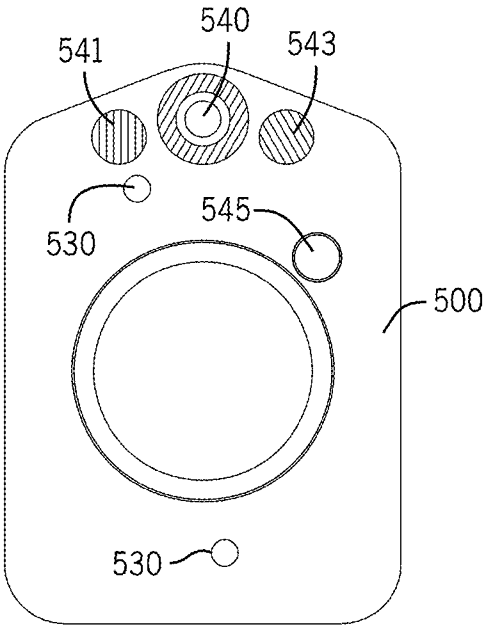
FIG. 7 is a front view of the tank connection.
Figure 8:
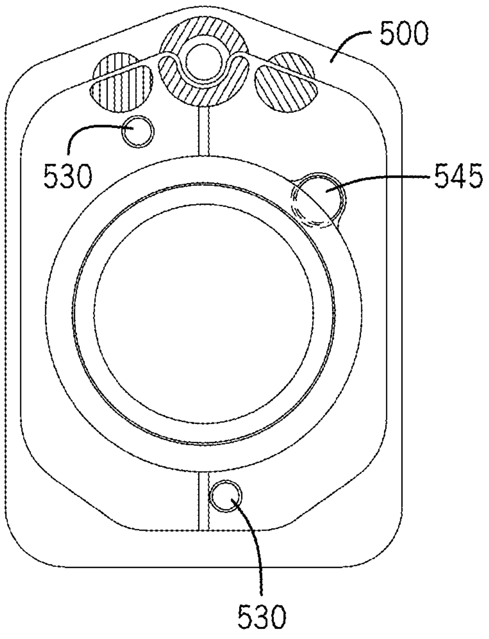
FIG. 8 is a view of the hose connection fitting over the tank connection.
Figure 9:
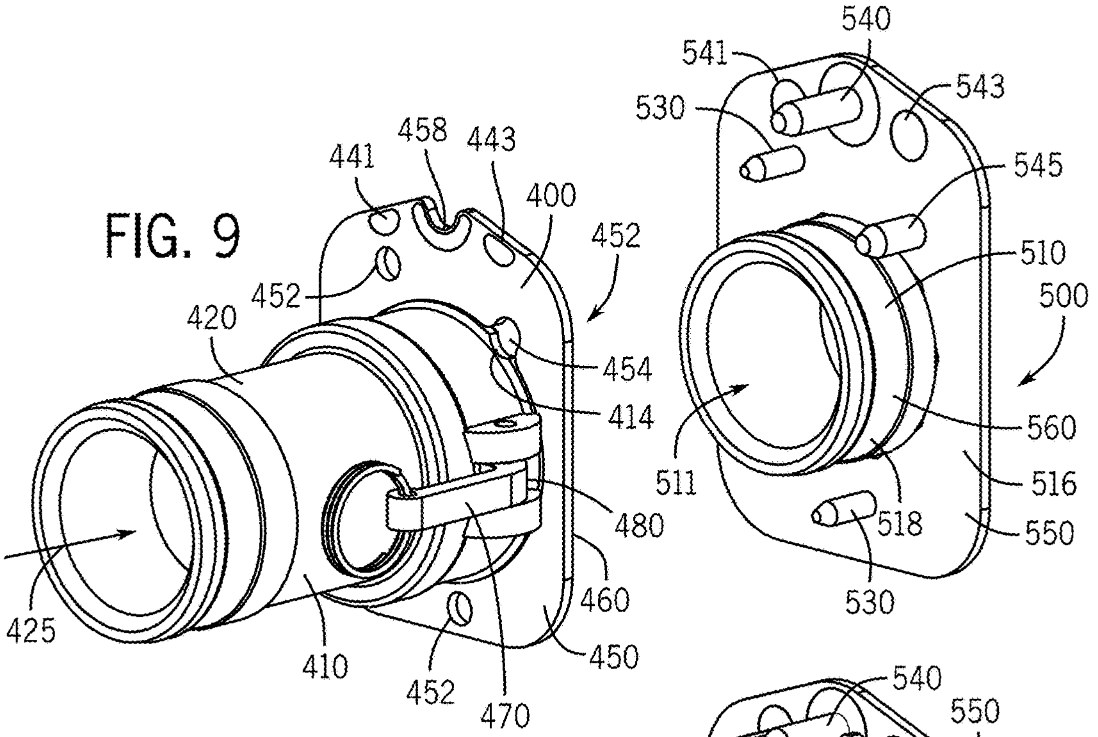
FIG. 9 is a perspective view of the hose connection.

In the aspect of FIG. 4, the subcontroller 200 is shown with a power button 210. The subcontroller 200 may include one or more different indicators for different conditions. For example, indicator 220A may illuminate when the door 310 is open. For example, indicator 220B may illuminate when the door 310 is unlocked. For example, indicator 220C may illuminate when the hose connection 400 is not in the locker 300. The HMI 110 of the main controller 100 may simultaneously display the same or similar indicators. In other aspects, an HMI on the subcontroller 200 may be used instead or in conjunction with the power button 210 and the indicators 220A, 220B, 220C. The subcontroller 200 may control a single locker 300 or multiple lockers 300. In other aspects, the subcontroller 200 may be integrated into the locker 300.

The main controller 100 may include a camera or scanning device 120 to read a bar code or other code on a bill of lading 40 provided by the user. By reading the bar code, the system 10 opens the correct locker 300 having the correct hose connection 400 for the specific chemical. Thus, this reduces the likelihood of the user filling one of the bulk storage tanks 30 with the wrong chemical. In other aspects, the user may input a code from the bill of lading 40 or other record using the HMI 110 or other keypad or keyboard of the main controller 100. Upon inputting the code, the system 10 opens the correct locker 300 having the correct hose connection 400 for the specific chemical. The scanning device 120 may be an optical scanner, such as an OCR reader or a barcode reader, to read a barcode, a QR code or other indicia. The scanning device 120 may also be an RFID reader to read data from one or more RFID tags or devices. In another aspect, the scanning device 120 may include both an optical scanner and an RFID reader. In another aspect, the scanning device 120 may sense or receive a signal emitted from a computing device having the bill of lading 40.

The main controller 100 may further include a programmable logic controller and a database. The database may maintain a log of deliveries to the industrial facility 20. The database may maintain a listing of the available volumes of the chemicals in the bulk storage tanks 30. The database may maintain a listing of deliveries to the industrial facility 20. The main controller and database may provide warnings, updates, notifications, etc. regarding the status or current volumes of chemicals held in the bulk storage tanks 30. The main controller 100 may be in electrical communications with volume or level sensors in the bulk storage tanks 30. The main controller 100 may further include communications hardware. Such communications hardware may transmit signals or notices regarding the status of the system 10. The main controller 100 may be in electrical communication with or network with other operating systems or computer networks at the industrial facility 20.

Each hose connection 400 is configured to connect with only one specific tank connection 500. The tank connections 500 are configured to be non-removable from their respective bulk storage tank 30. When operated, the system 10 opens the appropriate locker 300 with the correct hose connection 400 for the specific chemical based on the system 10's reading of the bill of lading 40. This reduces the likelihood of the user filling one of the bulk storage tanks 30 with the wrong chemical. The lockers 300 are configured to hold or contain the hose connection 400 in a locked configuration or an open configuration. In the locked configuration, the door 310 or other securing structure is locked and the hose connection 400 cannot be removed from the locker 300 absent destructive techniques. In the open configuration, the door 310 is unlocked and the hose connection 400 may be removed from the locker 300. The main controller 100 and/or the subcontrollers 200 directs the lockers 300 to switch between the locked configuration and the open configuration. The lockers 300 may switch, change, or alternate between the locked configuration to the unlocked configuration as directed or controlled by the main controller 100 or one of the subcontrollers 200.

The bulk storage tanks 30 may store any of a variety of chemicals, such as chlorine, caustic, peracetic acid (PAA), and others. The system 10 may include several bulk storage tanks 30 with the same chemical at the same industrial facility 20.

The hose connection 400 and the tank connection 500 will now be described with reference to FIGS. 6-19.

The tank connection 500 is generally permanently installed on the bulk storage tank 30 by the operator or manufacturer. The tank connection 500 includes fittings or couplings used to make fluidic connection with other fittings or couplings. For example, the specific tank connection 500 may welded to the bulk storage tank 30. The user does not generally remove or replace the tank connection 500. The tank connection 500 includes a male cam lock 510. The hose connection 400 includes fittings or couplings used to make fluidic connection with other fittings or couplings. The hose connection 400 includes a female cam lock 410 that fits over the male cam lock 510 of the tank connection 500 to fluidically connect the delivery hose 50 with the bulk storage tank 30. In certain aspects, the hose connection 400 is attached to the locker 300 via a chain or cable to prevent removal of the hose connection 400.

Figure 10:
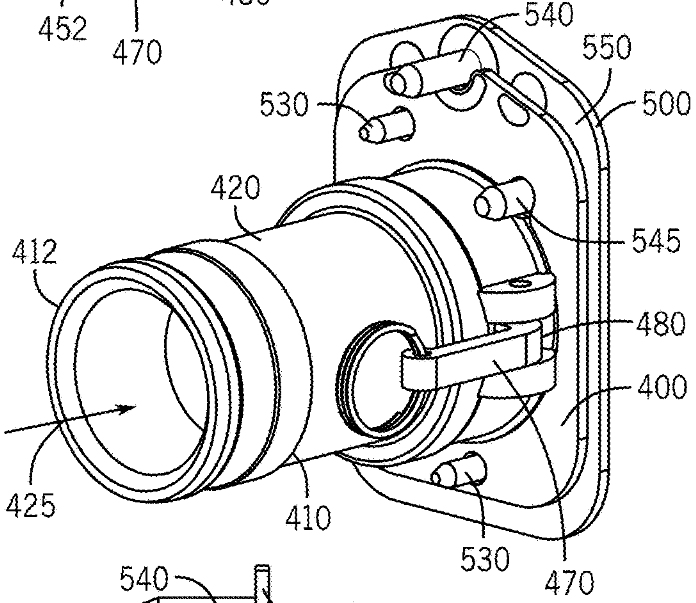
FIG. 10 is a perspective view of the hose connection fitting over the tank connection.
Figure 11:
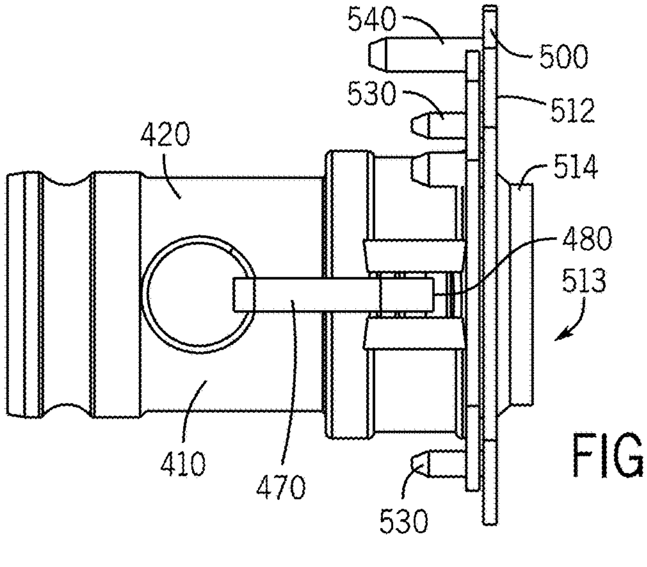
FIG. 11 is a side view of the hose connection fitting over the tank connection.
Figure 12:
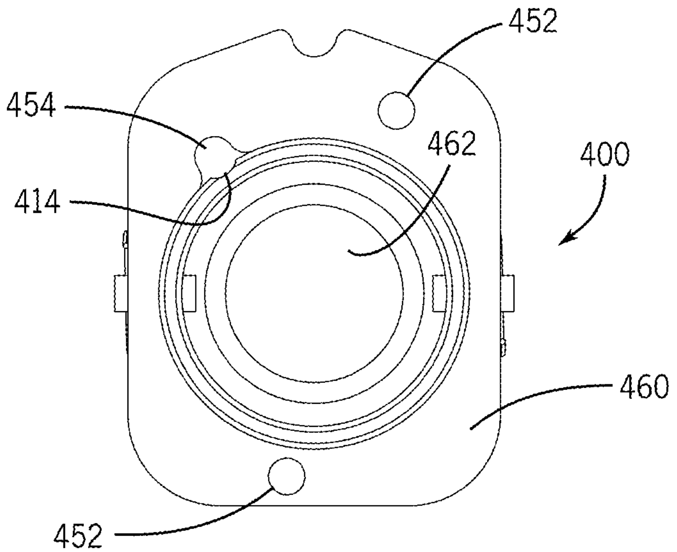
FIG. 12 is a rear view of the hose connection.
Figure 13:
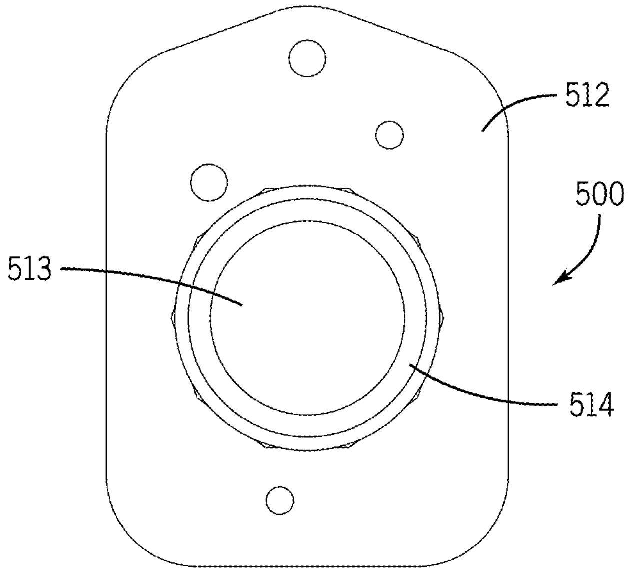
FIG. 13 is a rear view of the tank connection.

When the female cam lock 410 fits over the male cam lock 510, as shown in FIG. 10, levers 470 are actuated to tighten cams 480 into a circumferential channel 560 in the cylindrical sidewalls 518 of the male cam lock 510. The cams 480 hold the female cam lock 410 and the male cam lock 510 together.

As described herein, the hose connection 400 and tank connection 500 may include one or more mechanical features or graphical/pictorial indicators to help ensure the correct chemical is delivered to the correct bulk storage tank 30. This provides confirmation that the correct chemical has been delivered to the correct bulk storage tank 30. This helps to reduce the accidental mixing of the wrong chemicals.

The male cam lock 510 extends from a male key plate 550. In this aspect, the male cam lock 510 extends generally perpendicular from the male key plate 550. A rear surface 512 of the male key plate 550 includes a weld-on connection 514 that is fitted and welded to an opening in the bulk storage tank 30. In this aspect, the male cam lock 510 extends from a front surface 516 of the male key plate 550. Further, one or more combination pins 530, a locking pin 545, and/or a centering pin 540 may extend from the front surface 516 of the male key plate 550.

The one or more combination pins 530 help to ensure that the correct hose connection 400 is used with the correct tank connection 500. In this aspect, two combination pins extend from the male key plate 550. In other aspects, additional combination pins 530 may be utilized. The combination pins 530 may positioned in any of a variety of locations on the male key plate 550. The combination pins 530 may be moved vertically and/or laterally to various different positions on the front surface 516 of the male key plate 550. This provides a unique design for the hose connection 400 and tank connection 500 and a range of different designs. Each chemical has a specific hose connection 400 and tank connection 500. Thus, for example, the hose connection 400 for Chemical A will not function with the tank connection 500 for Chemical B. Complementary through-holes 452 are formed in the female key plate 450 that receive the one or more combination pins 530. When the correct hose connection 400 is aligned with the correct tank connection 500, the one or more combination pins 530 will pass through the through-holes 452 and the rear surface 460 of the female key plate 450 will lay flush or seal against the front surface 516 of the male key plate 550.

In this aspect, the centering pin 540 is positioned at an upper portion of the male key plate 550. In this aspect, the female key plate 450 includes a notch 458 in an upper edge of the male key plate 550 configured to receive the centering pin 540. In other aspects, the notch 458 may include a through-hole. A perimeter of the notch 458 may be colored with a first color, while a perimeter of the centering pin 540 may be colored with the first color. This provides the user with a visual indication to assist in proper alignment of the hose connection 400 and the tank connection 500. Further, a first visual indicator 541 of a second color and a second visual indicator 543 of a third color may be positioned on opposite side of the centering pin 540. The first visual indicator 541 and the second visual indicator 543 correspond to a first visual indictor 441 of the first color and a second visual indicator 443 of the third color, which are positioned on opposite sides of the notch 458. When the hose connection 400 is properly aligned with the tank connection 500, the first visual indictor 441 and the first visual indicator 541 are proximate each other and the second visual indicator 443 and the second visual indicator 543 are similarly proximate each other. In this aspect, the centering pin 540 is longer than the one or more combination pins 530 and the locking pin 545.

In this aspect, the locking pin 545 is positioned next to or immediately adjacent to the male cam lock 510 of the tank connection 500. The locking pin 545 helps to prevent use of a generic or conventional female cam lock by physically blocking the generic or conventional female cam lock from fitting over the male cam lock 510. In this aspect, the female key plate 450 includes a through-hole 454 positioned to receive the locking pin 545. In this aspect, a groove 414 is formed in an outer diameter of the female cam lock 410 at the rear opening 462. In this aspect, the groove 414 is aligned or adjacent with the through-hole 454. When the hose connection 400 is properly aligned with the tank connection 500, the locking pin 545 passes through both the through-hole 454 and the groove 414. A generic or conventional cam lock does not have the groove 414, and thus would not fit over the locking pin 545. In this aspect, the groove 414 is partially formed or cut into the outer diameter of the female cam lock 410. The groove 414 may lead to the rear opening 462 of the hose connection 400.

The tank connection 500 includes the male cam lock 510. Cylindrical sidewalls 518 define a front opening 520 for the male cam lock 510 and a fluid passage 511. A rear opening 513 is formed at the rear surface 512. The front opening 520 is in fluidic communication with the rear opening 513 via the fluid passage 511. The locking pin 545 is adjacent to the cylindrical sidewalls 518.

The hose connection 400 includes a front opening 412 and a rear opening 462. Cylindrical sidewalls 420 define the front opening 412 and lead to the rear opening 462. A fluidic passage 425 fluidically connects the front opening 412 and the rear opening 462. The cylindrical sidewalls 420 help define the fluidic passage fluidic passage 425. The front opening 412 is at a distal portion of the female cam lock 410. The rear opening 462 is formed in the female key plate 450 and is accessed from a rear surface 460 of the female key plate 450.

During use, the female cam lock 410 fits over the male cam lock 510. The male cam lock 510 fits into the rear opening 462 of the female key plate 450. The delivery hose 50 fits over the front opening 412 of female cam lock 410. The rear opening 462 of the female key plate 450 is sized and shape to fit over or be just larger than the male cam lock 510. When locked, the female cam lock 410 and the male cam lock 510 provide a sealed connection.

Figure 14:
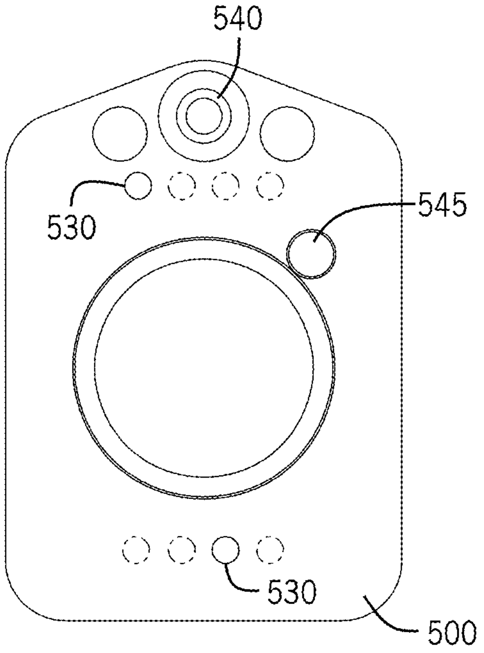
FIG. 14 is a view of the different positions of the combination pins.

With respect to FIG. 14, a range of different positions are illustrated for the one or more combination pins 530 and the through-holes 452. The one or more combination pins 530 may extend from a range of different locations on the front surface 516, and the through-holes are likewise located to receive the combinations pins 530. This range provide many different combinations to provide a unique hose connection 400 and a unique tank connection 500 for many different bulk storage tanks 30. This range provides a "keyed combination" that may be changed for different chemicals. A particular industrial facility may assign particular keyed combinations for the various chemicals stored in their facility. In other aspects, chemical providers may assign a particular keyed combination to a specific chemical.

Figure 15:
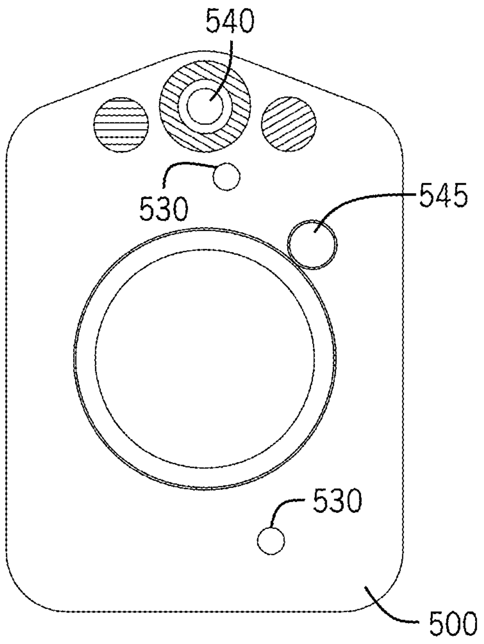
FIG. 15 is a view of the tank connection with alternate combination pins.
Figure 16:
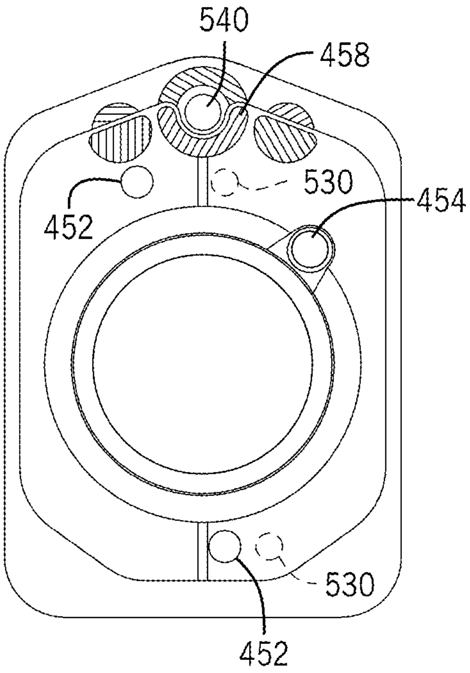
FIG. 16 is a view of incompatible hose and tank connections.

With respect to FIG. 15, a view of the tank connection with alternate locking pins is shown. FIG. 15 illustrates another example of a compatible hose connection 400 and tank connection 500.

In contrast, FIGS. 16-19 illustrate when the wrong hose connection 400 is used with the wrong tank connection 500. As can be seen, the incompatible hose connection 400 and the tank connection 500 are not able to seal together, as the one or more combination pins 530 do not line with the through-holes 452. Thus, the rear surface 460 of the female key plate 450 will not lay flush or seal against the front surface 516 of the male key plate 550.

In other aspects, the hose connection 400 and tank connection 500 may be used separate from the system 10, the main controller 100, the lockers 300, etc. For example, a chemical delivery vendor or a plant manager may assign a first set of hose connection 400 and tank connection 500 with a first keyed combination to a first chemical, a second set of hose connection 400 and tank connection 500 with a second keyed combination to a second chemical, a third set of hose connection 400 and tank connection 500 with a third keyed combination to a third chemical, and so on. The various tanks connections 500 are installed on the appropriate bulk storage tanks 30 designated to hold the particular chemical. The delivery vendor may carry the various hose connection 400 with them for their deliveries, or the plant may store the hose connection 400 until needed by the delivery vendor.

Figure 2:
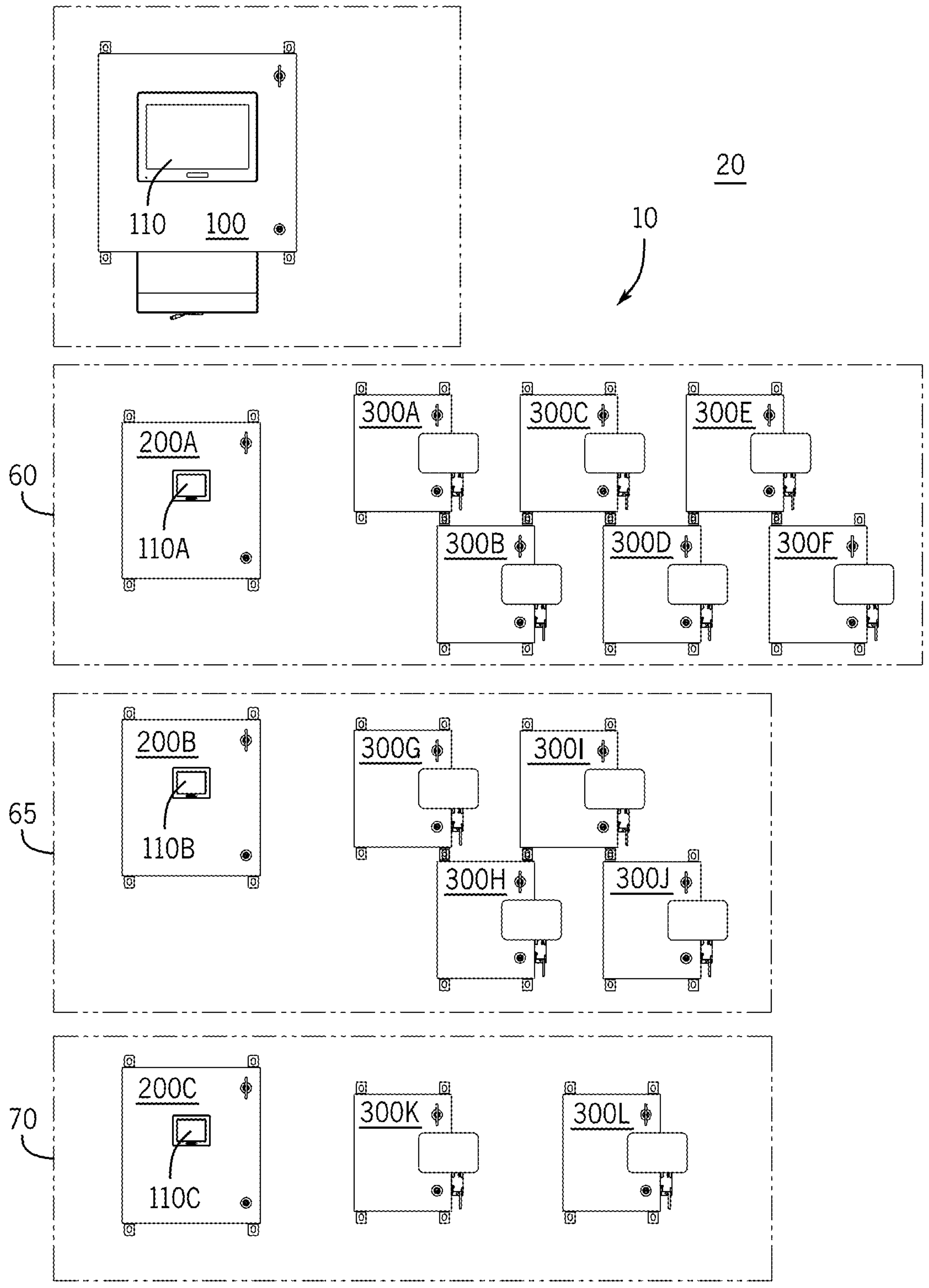
FIG. 2 is a schematic view of the main controller, the subcontrollers, and the lockers of the system.
Figure 3:
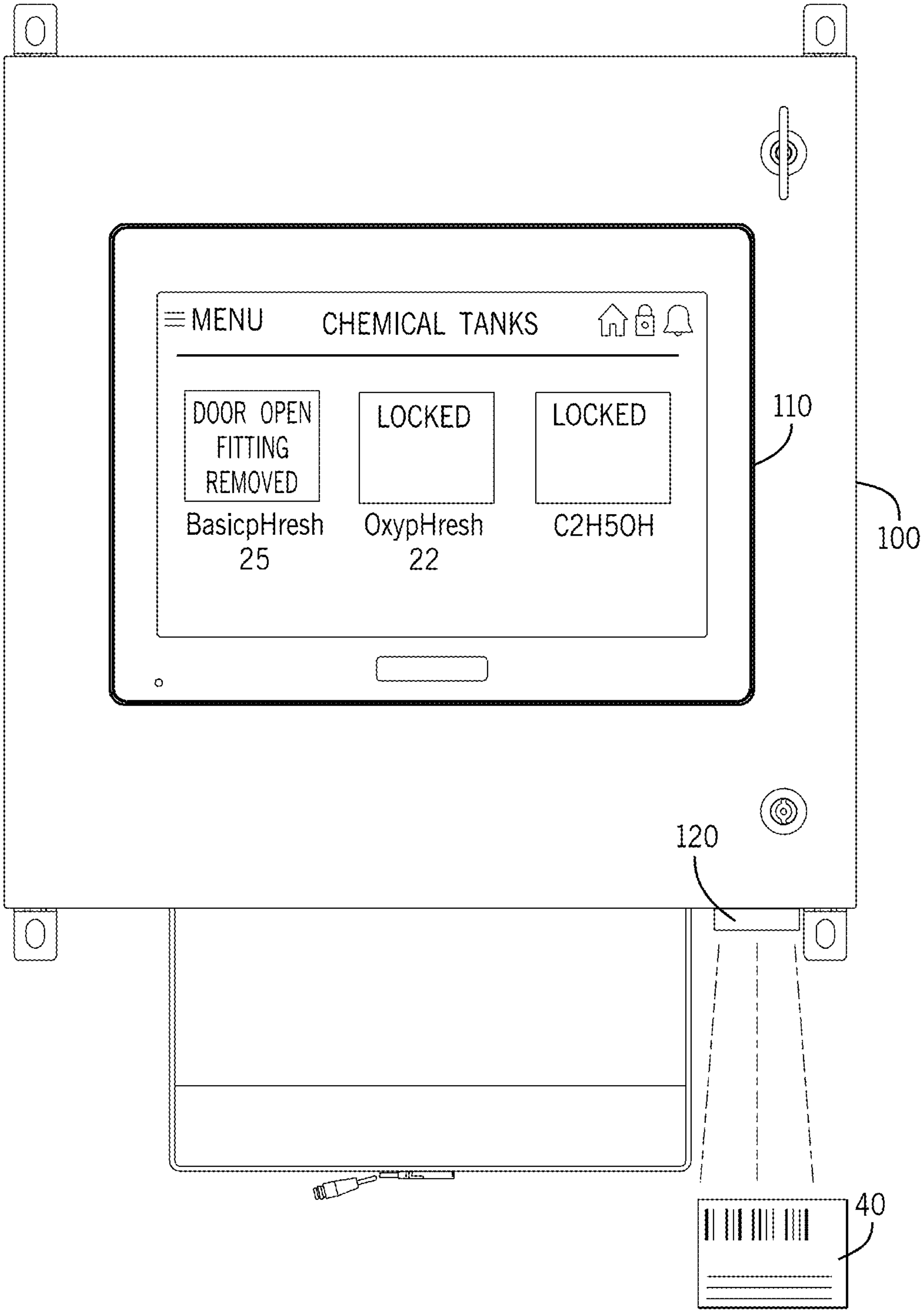
FIG. 3 is view of the main controller.

An example of the use and operation of the system 10 will now be described. With reference to FIG. 2, the system 10 is installed at an industrial facility 20 having a first plant 60, a second plant 65, and a waste-water management plant 70. The main controller 100 is installed at a guard shack of the industrial facility 20.

The first plant 60 includes a subcontroller 200A with a HMI 110A and lockers 300A, 300B, 300C, 300D, 300E, and 300F. The second plant 65 includes a subcontroller 200B with a HMI 110B and lockers 300G, 300H, 300I, and 300J. The waste-water management plant 70 includes a subcontroller 200C with an HMI 110C and lockers 300K and 300L. In this example, ethernet connectivity is provided between the main controller 100, the subcontrollers 200A, 200B, and 200C, and the respective lockers 300A-L.

The first plant 60 includes bulk storage tanks (not shown) for each of Chemicals A, B, C, D, E, and F. The second plant 65 includes bulk storage tanks (not shown) for each of Chemicals A, B, C, and D. The waste-water management plant 70 include bulk storage tanks for waste water treatment Chemicals E and F.

In this example, the HMI 110 of the main controller 100 shows status of all of the twelve lockers 300 in the industrial facility 20, namely lockers 300A-L. The HMI 110A of subcontroller 200A shows the status of lockers 300A-F. The HMI 110B of subcontroller 200B shows the status of lockers 300G-J. The HMI 110C of subcontroller 200C shows the status of lockers 300K and 300L.

In this example, the HMI 110, 110A, 110B, and 110C displays a green icon for the particular chemical when the respective hose connection 400 for that chemical is inside of the locker 300 and the door 310 is locked. When the locker 300 is unlocked, the green icon starts flashing. When the locker door 310 is opened, the icon becomes solid red. When the hose connection 400 is removed from the locker 300, the icon flashes red and yellow alternatively.

In this example, the main controller 100 is programmed such that the locker door 310 cannot be locked if the hose connection 400 is not placed inside the locker 300. In this example, no two lockers 300 can be opened at the same time. These parameters may be changed depending upon the preference of the operators of the system 10 or the industrial facility 20.

Below is description of the delivery process for a delivery of Chemical A. In this example, the Chemical A happens to be stored in separate tanks 30 in both the first plant 60 and in the second plant 65. The locker 300A and 300G include the correct hose connections 400 for Chemical A.

The bulk delivery truck carrying Chemical A arrives at the guard shack of the industrial facility 20 and gets the bill of lading 40 scanned. The bill of lading 40 is slid into a scanning tray of the main controller 100, which trips a sensor that turns on the scanning device 120. The scanning device 120 reads a bar code on bill of lading 40 and corresponding data is sent to the main controller 100. In this example, the bar code reads delivery of the Chemical A.

The main controller 100 transmits the data to a subcontroller 200A and a subcontroller 200B. The subcontroller 200A unlocks a locker 300A at the first plant 60. The subcontroller 200B unlocks a locker 300G at the second plant 65. On the HMI 110, icons for Chemical A at the first plant 60 and for Chemical A at the second plant 65 start flashing green. On the HMI 110A of the subcontroller 200A, the icon for Chemical A starts flashing green to indicate that the door 310 for the locker 300A is unlocked. On the HMI 110B of the subcontroller 200B, the icon for Chemical A starts flashing green to indicate that the door 310 for the locker 300G is unlocked. In this example, the main controller 100 starts a two-hour timer for the doors 310 to remain unlocked.

The delivery truck drives to the first plant 60. The door 310 for the locker 300A is opened, which sends a signal to the main controller 100 that the door 310 for the locker 300A is opened. The main controller 100 transmits to the subcontroller 200B, and the subcontroller 200B re-locks the door 310 to the locker 300G, the icons for Chemical A at the second plant 65 changes to steady green on the HMI 110 and on the HMI 110B. The opening of the door 310 for the locker 300A resets the two-hour timer. The icons for Chemical A on the HMI 110 and the HMI 110A change from flashing green to solid red, indicating that door 310 for the locker 300A is open.

The hose connection 400 is next removed from the locker 300A. When the hose connection 400 is removed, the icons for Chemical A on the HMI 110 and the HMI 110A change to flashing red and yellow alternatively. When the hose connection 400 is removed, the main controller 100 starts a three-hour timer. If the three-hour timer times out, alarm contacts close and a text message is sent to a safety manager. If the hose connection 400 is returned before the three-hour timer times out, the timer is reset. When the hose connection 400 is returned to the locker 300A, the icons for Chemical A on the HMI 110 and the HMI 110A change from flashing red/yellow to solid red. When the door 310 for locker 300A is closed, the door 310 is re-locked, and the icons for Chemical A on HMI 110 and HMI 110A change to solid green. All icons show green and the system 10 is back to ready configuration or status.

Below is description of the delivery process if a first chemical tanker to deliver Chemical B arrives at the guard shack about the same time as a second chemical tanker arrives to deliver Chemical C.

A first bill of lading 40 for the first chemical tanker is scanned, and the proper chemical locker (300B in this example) is unlocked for 2 hours, as described above. The first driver goes to the proper unloading area and opens locker 300B and removes the hose connection 400.

The bill of lading 40 for the second chemical tanker is scanned, and Chemical C is scheduled to go to bulk tank 30 for Chemical C, which corresponds to locker 300C.

The icons on HMI 110 and the HMI 110B for locker 300B are flashing red/yellow alternatively, which shows that the hose connection 400 is removed from locker 300B. The icons on HMI 110 and HMI 110C for locker 300C are solid yellow, showing that the second bill of lading 40 has been scanned, but the locker 300C is not unlocked.

As soon as the hose connection 400 is returned to locker 300B and the door 310 is closed, the locking mechanism 316 actuates, and the icons for HMI 110 and the HMI 110B for locker 300B show solid green. The locker 300C is then unlocked for 1 hour. The icons on HMI 110 and HMI 110C for locker 300C go from solid yellow for the wait period, to flashing green showing that locker 300C is now unlocked. The delivery process continues as outlined above.

In other aspects, a method of monitoring bulk chemical delivery is described. The method includes providing a monitoring system comprising a controller; a tank connection, the tank connection configured to fluidically connect with a bulk chemical tank; a hose connection, the hose connection configured to fluidically connect with a delivery hose and the tank connection; a locker configured to hold or contain the hose connection in a locked configuration or in an unlocked configuration; and the controller directs the locker to switch between the locked configuration and the unlocked configuration. The method includes reading a bar code or other code on a bill of lading or other delivery document. The method includes directing the locker to switch from the locked configuration to the unlocked configuration. The method includes detecting a return of the hose connection to the locker. The method includes directing the locker to switch from the unlocked configuration to the locked configuration.

In an aspect, the method includes directing the locker to switch from the locked configuration to the unlocked configuration based on data from the reading of the bar code or other code.

In an aspect, the method includes removing the hose connection from the locker and connecting the hose connection to a delivery hose.

In an aspect, the method includes displaying a status on an HMI of the controller that a door of the locker is open, the door of the locker is closed, the door is locked, the door in unlocked, the hose connection is in an interior of the locker, that the hose connection is not in the interior of the locker, or that an alarm condition has been sounded.

In an aspect, the method includes fitting a female cam lock of the hose connection over a male cam lock of the tank connection.

In other aspects, a method of monitoring bulk chemical delivery is described. The method includes providing a monitoring system comprising a controller, two or more lockers, two or more hose connections, and two or more tank connections, and two or more lockers, wherein each locker is configured to hold or contain one of the hose connections in a locked configuration or in an unlocked configuration; and the controller directs the lockers to change between the locked configuration and the unlocked configurations. The method includes reading a bar code or other code on a bill of lading or other delivery document. The method includes directing one of the lockers to change from the locked configuration to the unlocked configuration.

In an aspect, the method includes determining which of the two or more lockers to change to the unlocked configuration by reading the bar code or other code on the bill of lading or other delivery document.

In an aspect, the method includes determining a chemical that is to be delivered by reading the bar code or other code on the bill of lading or other delivery document and opening the locker with the hose connection for the chemical.

In other aspects, a method of monitoring bulk chemical delivery is described. The method includes providing two or more lockers, wherein each locker is configured to hold or contain a hose connection in a locked configuration or in an unlocked configuration. The method includes reading a bar code or other code on a bill of lading or other delivery document to obtain delivery data. The method includes transmitting the delivery data to a controller. The method includes selecting one of the two or more lockers to switch to the unlocked configuration based on the delivery data. The method includes directing a selected locker to switch from the locked configuration to the unlocked configuration.

In other aspects, a connection system for bulk chemical delivery is described. The system includes a tank connection, the tank connection configured to fluidically connect with a bulk chemical tank. The system includes a hose connection, the hose connection configured to fluidically connect with a hose and the tank connection. The tank connection includes a male cam lock, wherein the male cam lock extends from a front surface of a male key plate. Two or more combination pins extend from the front surface of the male key plate. The hose connection includes a female cam lock, wherein the female cam lock extends from a front surface of a female key plate, wherein two or more through-holes are formed in the female key plate. The female cam lock fits over the male cam lock and the two or more through-holes are configured to receive the two or more combination pins.

In an aspect, the connection system includes a locking pin that extends from the front surface of the male key plate.

In an aspect, the locking pin is positioned next to or immediately adjacent to the male cam lock of the tank connection.

In an aspect, cylindrical sidewalls define a front opening for the male cam lock and a fluid passage, wherein a rear opening is formed at a rear surface, and the front opening is in fluidic communication with the rear opening via the fluid passage, and the locking pin is adjacent to the cylindrical sidewalls.

In an aspect, the female key plate includes a through-hole positioned or configured to receive the locking pin.

In an aspect, the female key plate includes a through-hole configured to receive the locking pin, and wherein a groove is formed in the female cam lock adjacent or next to the through-hole configured to receive the locking pin.

In an aspect, the female key plate includes a through-hole positioned or configured to receive the locking pin, wherein a groove is formed in an outer diameter of the female cam lock adjacent or next to the through-hole configured to receive the locking pin, the locking pin is parallel to a length of the female cam lock.

In an aspect, a centering pin extends from the front surface of the male key plate.

In an aspect, the centering pin is positioned at an upper portion of the male key plate, and the female key plate includes a notch in an upper edge of the female key plate that is configured to receive the centering pin.

In an aspect, a perimeter of the notch is colored with a first color, while a perimeter of the centering pin is also colored with the first color to provide a visual indication to assist in alignment of the hose connection and the tank connection.

In an aspect, a rear surface of the male key plate includes a connection configured to be fitted to an opening in a bulk storage tank.

In an aspect, the hose connection includes a front opening and a rear opening, wherein the hose connection includes cylindrical sidewalls that define the front opening and lead to the rear opening, and a fluidic passage fluidically connects the front opening and the rear opening.

In an aspect, the male cam lock is configured to fit into the rear opening of the female key plate.

In an aspect, the two or more combination pins are positioned on the male key plate are configured to fit within openings in a specific female key plate.

In other aspects, a connection system for bulk chemical delivery is described. The system includes a first tank connection, the first tank connection configured to fluidically connect with a first bulk chemical tank. The system includes a first hose connection, and the first hose connection configured to fluidically connect to the first tank connection. The first tank connection includes a first male cam lock, wherein the first male cam lock extends from a front surface of a first male key plate, and wherein a combination pin extends from a first location on the front surface of male key plate. The first hose connection includes a first female cam lock. The first female cam lock extends from a front surface of a first female key plate, and wherein a through-hole is formed in the first female key plate. The first female cam lock is configured to fit over the male cam lock and the through-hole is configured to receive the combination pin. The system includes a second tank connection. The second tank connection configured to fluidically connect with a second bulk chemical tank. The system includes a second hose connection. The second hose connection configured to fluidically connect to the second tank connection. The second tank connection includes a second male cam lock. The second male cam lock extends from a front surface of a second male key plate. A combination pin extends from a second location on the front surface of male key plate, and wherein the first location is positionally different than the second location. The second hose connection includes a second female cam lock. The second female cam lock extends from a front surface of a second female key plate. A through-hole is formed in the second female key plate. The hose female cam lock is configured to fit over the male cam lock and the through-hole is configured to receive the combination pin.

In an aspect, the first hose connection cannot fluidically connect with the second tank connection.

In an aspect, the first location is positionally different than the second location in vertical location, horizontal location, or both vertical and horizontal location.

In an aspect, the through-hole formed in the first female key plate does not align with the combination pin of the second male key plate.

In an aspect, the first location provides a first keyed combination, and the second location provides a second keyed combination.

In an aspect, the first keyed combination is different from the second keyed combination.

In other aspects, fittings for bulk chemical delivery are described. A tank fitting is configured to fluidically connect with a bulk chemical tank. A hose fitting is configured to fluidically connect with a hose and the tank connection. The tank fitting includes a male cam lock, and the male cam lock extends from a front surface of a male key plate. A combination pin extends from the front surface of the male key plate. The hose fitting includes a female cam lock, and wherein the female cam lock extends from a front surface of a female key plate. A through-hole is formed in the female key plate. The female cam lock is configured to fit over the male cam lock and the through-hole receives the combination pin.

In other aspects, the combination pin is configured to align with the through-hole.

In other aspects, the combination pin is configured to pass through the through-hole and a rear surface of the female key plate is configured to lay flush or seal against the front surface of the male key plate.

In other aspects, a location of the combination pin on the front surface of the male key plate and a location of the through-hole in the female key plate provide a keyed combination for the fittings.

In other aspects, the location of the combination pin on the front surface of the male key plate and the location of the through-hole are different from other fittings.

In other aspects, wherein a locking pin extends from the front surface of the male key plate, the female key plate includes a through-hole positioned to configured to receive the locking pin, wherein a groove is formed in an outer diameter of the female cam lock adjacent or next to the through-hole that is configured to receive the locking pin.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A monitoring system for bulk chemical delivery, comprising:

a controller;

a tank connection, the tank connection configured to fluidically connect with a bulk chemical tank;

a hose connection, the hose connection configured to fluidically connect with a hose and the tank connection;

a locker; the locker configured to hold or contain the hose connection in a locked configuration or in an unlocked configuration; and the controller directs the locker to switch between the locked configuration and the unlocked configuration, wherein the controller is in electrical communication with a scanning device or camera, and the scanning device or camera is configured to read a bar code or other code on a bill of lading or other delivery document.

2. The monitoring system for bulk chemical delivery according to claim 1, wherein the hose connection is configured to operate with a specific tank connection.

3. The monitoring system for bulk chemical delivery according to claim 1, wherein the hose connection is configured to connect with only the tank connection.

4. The monitoring system for bulk chemical delivery according to claim 1, wherein the tank connection is permanently installed on a bulk storage tank.

5. The monitoring system for bulk chemical delivery according to claim 1, wherein a subcontroller directs the locker to switch between the locked configuration and the unlocked configuration, and the subcontroller is in electrical communications with the controller.

6. The monitoring system for bulk chemical delivery according to claim 1, wherein the locker includes an interior configured to hold the hose connection and a door is hingedly engaged to the locker to cover the interior and prevent access to the hose connection.

7. The monitoring system for bulk chemical delivery according to claim 6, wherein, in the locked configuration, the door is locked closed by a locking mechanism, and wherein, in the unlocked configuration, the locking mechanism is unlocked and the door is free to open.

8. The monitoring system for bulk chemical delivery according to claim 1, wherein the controller directs the locker to switch between the locked configuration and the unlocked configuration after reading the bar code or other code, and the controller directs the locker to switch to the locked configuration after the hose connection is returned to the locker.

9. The monitoring system for bulk chemical delivery according to claim 1, wherein the controller includes a human machine interface to communicate with and operate the system, and the human machine interface configured to display an indicator regarding a status of the system.

10. The monitoring system for bulk chemical delivery according to claim 9, wherein the status includes a door of the locker is open, the door of the locker is closed, the door is locked, the door in unlocked, the hose connection is in an interior of the locker, that the hose connection is not in the interior of the locker, or that an alarm condition has been sounded.

11. The monitoring system for bulk chemical delivery according to claim 1, further comprising additional lockers, wherein the controller directs one of the lockers to switch between the locked configuration and the unlocked configuration based on user input into the controller.

12. The monitoring system for bulk chemical delivery according to claim 11, wherein the lockers hold two or more different hose connections.

13. The monitoring system for bulk chemical delivery according to claim 1, the system further comprising additional lockers, wherein the controller directs one of the lockers to switch between the locked configuration and the unlocked configuration based on a reading of the bill of lading or other delivery document by the camera or scanning device.

14. The monitoring system for bulk chemical delivery according to claim 1, wherein the hose connection includes a female cam lock, wherein the tank connection includes a male cam lock, and the female cam lock fits over the male cam lock.

15. A monitoring system for bulk chemical delivery, comprising:

a controller;

a tank connection, the tank connection configured to fluidically connect with a bulk chemical tank;

a hose connection, the hose connection configured to fluidically connect with a hose and the tank connection;

a locker; the locker configured to hold or contain the hose connection in a locked configuration or in an unlocked configuration, and wherein the locker includes a detector that signals the controller when the hose connection is removed from or returned to an interior of the locker.

16. The monitoring system for bulk chemical delivery according to claim 15, wherein the controller is in electrical communication with a scanning device or camera, and the scanning device or camera is configured to read a bar code or other code on a bill of lading or other delivery document.

17. A monitoring system for bulk chemical delivery, comprising:

a controller;

a tank connection, the tank connection configured to fluidically connect with a bulk chemical tank;

a hose connection, the hose connection configured to fluidically connect with a hose and the tank connection;

a locker; the locker configured to hold or contain the hose connection in a locked configuration or in an unlocked configuration, and wherein the controller sends an alarm notification if the hose connection is not returned to the locker after a waiting period calculated by the controller.

18. A monitoring system for bulk chemical delivery, comprising:

a controller;

a first tank connection, the first tank connection configured to fluidically connect with a first bulk chemical tank;

a first hose connection, the first hose connection configured to fluidically connect with the first tank connection;

a first locker; the locker configured to hold or contain the first hose connection in a locked configuration or in an open configuration;

a second tank connection, the second tank connection configured to fluidically connect with a second bulk chemical tank;

a second hose connection, the second hose connection configured to fluidically connect with the second tank connection;

a second locker; the locker configured to hold or contain the second hose connection in a locked configuration or in an open configuration;

the controller directs the first locker and the second locker to switch between the locked configuration and the open configuration; and, wherein the first hose connection cannot fluidically connect with the second tank connection.

19. A monitoring system for bulk chemical delivery, comprising:

a controller;

a first tank connection, the first tank connection configured to fluidically connect with a first bulk chemical tank;

a first hose connection, the first hose connection configured to fluidically connect with the first tank connection;

a first locker; the locker configured to hold or contain the first hose connection in a locked configuration or in an open configuration;

a second tank connection, the second tank connection configured to fluidically connect with a second bulk chemical tank;

a second hose connection, the second hose connection configured to fluidically connect with the second tank connection;

a second locker; the locker configured to hold or contain the second hose connection in a locked configuration or in an open configuration;

the controller directs the first locker and the second locker to switch between the locked configuration and the open configuration; and wherein the controller is in electrical communication with a scanning device or camera, and the scanning device or camera is configured to read a bar code or other code on a bill of lading or other delivery document, wherein the controller directs one of the lockers to switch between the locked configuration and the open configuration based on a reading of the bill of lading or other delivery document by the camera or scanning device.

* * * * *